US008527334B2

(12) United States Patent
Porter et al.

(10) Patent No.: US 8,527,334 B2
(45) Date of Patent: Sep. 3, 2013

(54) ADVERTISING REVENUE SHARING

(75) Inventors: Erik Porter, Kirkland, WA (US); Tobin R. Titus, Issaquah, WA (US); Ernest A. Booth, Bellevue, WA (US); Mario Esposito, Redmond, WA (US); Vincent Edward Bannister, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 11/965,732

(22) Filed: Dec. 27, 2007

(65) Prior Publication Data

US 2009/0167766 A1 Jul. 2, 2009

(51) Int. Cl.
*G06Q 30/00* (2012.01)

(52) U.S. Cl.
USPC .................................... 705/14.16; 705/14.41

(58) Field of Classification Search
USPC .............. 705/14.12, 14.69, 14.7, 14.73, 14.1, 705/14.4; 715/751
See application file for complete search history.

(56) References Cited

U.S. PATENT DOCUMENTS

| | | | | |
|---|---|---|---|---|
| 5,740,388 | A | * | 4/1998 | Hunt .............................. 715/723 |
| 5,880,731 | A | * | 3/1999 | Liles et al. ..................... 715/758 |
| 5,977,968 | A | | 11/1999 | Le Blanc |
| 6,036,601 | A | | 3/2000 | Heckel |
| 6,236,978 | B1 | * | 5/2001 | Tuzhilin ........................ 705/7.29 |
| 6,385,592 | B1 | | 5/2002 | Angles et al. |
| 6,476,830 | B1 | | 11/2002 | Farmer et al. |
| 6,775,581 | B2 | | 8/2004 | Landers et al. |
| 6,910,186 | B2 | * | 6/2005 | Kim ............................... 715/706 |
| 6,954,728 | B1 | | 10/2005 | Kusumoto et al. |
| 7,054,928 | B2 | * | 5/2006 | Segan et al. ................... 709/225 |
| 7,101,284 | B2 | | 9/2006 | Kake et al. |
| 7,168,084 | B1 | | 1/2007 | Hendricks et al. |
| 7,212,985 | B2 | * | 5/2007 | Sciuk ........................... 705/7.33 |
| 7,249,139 | B2 | | 7/2007 | Chuah et al. |
| 7,257,552 | B1 | | 8/2007 | Franco |
| 7,421,660 | B2 | * | 9/2008 | Charnock et al. .............. 715/751 |
| 7,484,176 | B2 | * | 1/2009 | Blattner et al. ................ 715/758 |
| 7,568,004 | B2 | * | 7/2009 | Gottfried ....................... 709/204 |

(Continued)

FOREIGN PATENT DOCUMENTS

| | | |
|---|---|---|
| JP | 14023917 A | 1/2002 |
| KR | 1020010105429 A | 11/2001 |

(Continued)

OTHER PUBLICATIONS

Merriam-Webster, Incorporated, Merriam-Webster's Collegiate Dictionary, Tenth Edition (1998), pp. 992, 1252.*

(Continued)

*Primary Examiner* — John G Weiss
*Assistant Examiner* — Bennett Sigmond
(74) *Attorney, Agent, or Firm* — Hope Baldauff, LLC

(57) ABSTRACT

Technologies are described herein for sharing advertisement revenue. An advertiser-generated avatar is provided to a first participant. The advertiser-generated avatar may be associated with an advertisement. Further, the first participant may be associated with a current avatar. The current avatar is replaced with the advertiser-generated avatar. While the first participant is associated with the advertiser-generated avatar, a level of interaction between the first participant and other participants is monitored. An amount of compensation to provide the first participant is determined based on the level of interaction between the first participant and the other participants. The compensation is provided to the first participant.

8 Claims, 7 Drawing Sheets

(56) References Cited

U.S. PATENT DOCUMENTS

| | | | |
|---|---|---|---|
| 7,792,801 B2 | 9/2010 | Hamilton et al. | |
| 7,797,168 B2 | 9/2010 | Kusumoto et al. | |
| 7,996,264 B2* | 8/2011 | Kusumoto et al. | 705/14.16 |
| 8,348,762 B2 | 1/2013 | Willis | |
| 8,417,535 B2* | 4/2013 | Kusumoto et al. | 705/1.1 |
| 2002/0002509 A1 | 1/2002 | Wagorn et al. | |
| 2002/0007314 A1 | 1/2002 | Maruyama | |
| 2002/0036654 A1 | 3/2002 | Evans et al. | |
| 2002/0040332 A1 | 4/2002 | Maari et al. | |
| 2002/0052881 A1* | 5/2002 | Player | 707/104.1 |
| 2002/0052913 A1* | 5/2002 | Yamada et al. | 709/202 |
| 2002/0065746 A1* | 5/2002 | Lewis | 705/27 |
| 2004/0093266 A1 | 5/2004 | Dohring | |
| 2004/0148221 A1* | 7/2004 | Chu | 705/14 |
| 2004/0153366 A1 | 8/2004 | Olson et al. | |
| 2004/0248649 A1* | 12/2004 | Arai et al. | 463/32 |
| 2004/0250210 A1 | 12/2004 | Huang et al. | |
| 2005/0060259 A1* | 3/2005 | Holmes et al. | 705/40 |
| 2005/0149391 A1 | 7/2005 | O'Shea et al. | |
| 2005/0216346 A1* | 9/2005 | Kusumoto et al. | 705/14 |
| 2005/0223328 A1 | 10/2005 | Ashtekar et al. | |
| 2005/0251553 A1 | 11/2005 | Gottfried | |
| 2006/0100018 A1 | 5/2006 | Ganz | |
| 2006/0111979 A1 | 5/2006 | Chu | |
| 2006/0130095 A1 | 6/2006 | Willis et al. | |
| 2006/0155597 A1 | 7/2006 | Gleason | |
| 2006/0178975 A1 | 8/2006 | Jung | |
| 2006/0212561 A1* | 9/2006 | Feng | 709/223 |
| 2006/0293958 A1* | 12/2006 | Koenig | 705/14 |
| 2007/0035548 A1 | 2/2007 | Jung et al. | |
| 2007/0061333 A1 | 3/2007 | Ramer et al. | |
| 2007/0073582 A1* | 3/2007 | Jung et al. | 705/14 |
| 2007/0087799 A1* | 4/2007 | Van Luchene | 463/1 |
| 2007/0121843 A1 | 5/2007 | Atazky et al. | |
| 2007/0168863 A1 | 7/2007 | Blattner et al. | |
| 2007/0179867 A1* | 8/2007 | Glazer et al. | 705/27 |
| 2007/0200846 A1 | 8/2007 | Nakamura | |
| 2007/0203817 A1 | 8/2007 | Jung et al. | |
| 2007/0218987 A1 | 9/2007 | Van Luchene et al. | |
| 2007/0243936 A1* | 10/2007 | Binenstock et al. | 463/42 |
| 2007/0244750 A1 | 10/2007 | Grannan et al. | |
| 2007/0294096 A1* | 12/2007 | Randall et al. | 705/1 |
| 2008/0059304 A1* | 3/2008 | Kimsey | 705/14 |
| 2008/0163055 A1 | 7/2008 | Ganz et al. | |
| 2008/0163379 A1 | 7/2008 | Robinson | |
| 2008/0204450 A1* | 8/2008 | Dawson et al. | 345/419 |
| 2008/0208684 A1* | 8/2008 | Hamilton et al. | 705/14 |
| 2008/0215975 A1* | 9/2008 | Harrison et al. | 715/706 |
| 2008/0254419 A1* | 10/2008 | Cohen | 434/219 |
| 2008/0254426 A1* | 10/2008 | Cohen | 434/308 |
| 2008/0262908 A1* | 10/2008 | Broady et al. | 705/14 |
| 2008/0263446 A1* | 10/2008 | Altberg et al. | 715/706 |
| 2009/0019541 A1* | 1/2009 | Fontijn | 726/19 |
| 2009/0029769 A1 | 1/2009 | Muller | |
| 2009/0089310 A1* | 4/2009 | Lara et al. | 707/102 |
| 2009/0091565 A1 | 4/2009 | Booth et al. | |
| 2009/0094106 A1 | 4/2009 | Porter et al. | |
| 2009/0098939 A1* | 4/2009 | Hamilton et al. | 463/42 |
| 2009/0119173 A1 | 5/2009 | Parsons et al. | |
| 2009/0132361 A1 | 5/2009 | Titus et al. | |
| 2009/0192891 A1 | 7/2009 | Titus et al. | |
| 2009/0210301 A1 | 8/2009 | Porter et al. | |
| 2010/0058183 A1* | 3/2010 | Hamilton et al. | 715/706 |

FOREIGN PATENT DOCUMENTS

| | | |
|---|---|---|
| KR | 100614899 B1 | 8/2006 |
| WO | WO 01/24083 | 4/2001 |
| WO | WO 2004/053799 | 6/2004 |

OTHER PUBLICATIONS

International Search Report dated Jun. 17, 2009 in International Application No. PCT/US2008/087879.

Benkoil, "Will Google's Virtual World Plans Change Virtual Ad Economics?", Oct. 16, 2007, JackMyers.com, pp. 1-2.

Keeves, "Real or Virtual? Play the intersection, and build communities!" Mar. 24, 2007, IBC Solutions—Future Thinking, 1 page.

Poppe, S., "What's the idea?", Sep. 28, 2007, retrieved Oct. 25, 2007 at http://spoppe.livejournal.com/tag/advertising, pp. 1-13.

Tarumi, et al., "Communication through Virtual Active Objects Overlaid onto the Real World", Sep. 2000, Proceedings of the Third International Conference on Collaborative Virtual Environments (CVE 2000), ACM, pp. 155-164.

Whang, et al., "Lifestyles of Virtual World Residents, Living in the on-line game, 'Lineage'", Dec. 3-5, 2003, Proceedings of 2003 International Conference on Cyberworlds (CW'03), pp. 18-25.

Woywood, T., "Advertising, Branding & Marketing in Social Virtual Worlds", 2006, www.newton21,com, pp. 39-42.

Vedrashko, I., "Advertising in Computer Games", Sep. 2006, www.GamesBrandsPlay.com, 80 pages.

"Branding your Business with Avatars", retrieved Oct. 25, 2007, at http://www.pigandpanda.com/ebay-education/avatars.htm, Pig and Panda, pp. 1-3.

"The Buzz on . . . MMOGs and in-game advertising", retrieved Oct. 25, 2007, at www.iabuk.net/media/images/Thebuzzontheinternetsimpactongaming_1101.doc, Internet Advertising Bureau, pp. 1-13.

"Is this avatar attribute query issue I am thinking of valid?", Dec. 6, 2006, retrieved Oct. 25, 2007, at http://forums.activeworlds.com/showthread.php?p=39288, pp. 1-3.

"Marketing to Avatars", retrieved Oct. 25, 2007 at http://www.virtuallinks.net/?p=8, pp. 1-4.

"Second Life: Migration to Virtual Worlds and the Use of Time", Oct. 19, 2007, retrieved Oct. 26, 2007 at http://dusanwriter.wordpress.com/2007/10/19/second-life-migration-to-virtual-worlds-and-the-use-of-time/, 4 pages.

"The IBM Innovate Quick Internal Metaverse Project", May 2007, pp. 1-8.

Dibbell, "The Life of Chinese Gold Farmer", Jun. 17, 2007, The New York Times Company, 2007, pp. 1-9.

Terdiman, "Meet the Metaverse, Your New Digital Home", 1995-2007 CNET Networks, pp. 1-2.

U.S. Official Action dated Aug. 5, 2010 in U.S. Appl. No. 11/943,610.

U.S. Official Action dated Oct. 9, 2010 in U.S. Appl. No. 11/868,972.

U.S. Official Action date Feb. 3, 2011 in U.S. Appl. No. 11/868,967.

U.S. Official Action dated Jan. 24, 2011 in U.S. Appl. No. 11/943,610.

U.S. Official Action dated Nov. 17, 2010 in U.S. Appl. No. 12/022,122.

U.S. Official Action dated Dec. 8, 2010 in U.S. Appl. No. 12/031,683.

U.S. Official Action dated Jul. 21, 2011 in U.S. Appl. No. 11/868,967.

U.S. Official Action dated Jul. 14, 2011 in U.S. Appl. No. 11/868,972.

U.S. Official Action dated Apr. 28, 2011 in U.S. Appl. No. 12/022,122.

U.S. Official Action dated Aug. 9, 2011 in U.S. Appl. No. 12/031,683.

U.S. Official Action dated Jul. 9, 2012 in U.S. Appl. No. 12/022,122.

U.S. Official Action dated May 10, 2013 in U.S. Appl. No. 11/943,610.

U.S. Official Action dated Mar. 13, 2013 in U.S. Appl. No. 12/022,122.

* cited by examiner

ADVERTISING REVENUE SHARING

BACKGROUND

In recent years, massively multiplayer online ("MMO") computer applications, such as massively multiplayer online role-playing games ("MMORPGs"), have become extremely popular not only with serious gamers, but also with casual gamers and other Internet users. One example of a MMO computer application enables a participant to create and develop a fictional character in a virtual world. The fictional character is usually associated with an avatar or some other visual representation that enables other participants to recognize the particular fictional character. A given participant may develop, among other things, a storyline, a reputation, and attributes of her fictional character by interacting in the virtual world via the fictional character. Other examples of MMO computer applications may not involve the creation of a virtual world representation of the participant.

The virtual world typically includes an environment with a variety of virtual locations containing a variety of virtual objects. In some cases, the virtual locations and the virtual objects mimic realistic locations and objects, while in other cases, the virtual locations and virtual objects are fanciful creations. MMO computer applications generally permit the fictional character to travel across the virtual locations and interact with the virtual objects and other fictional characters.

Advertising in the modern age has proven to be increasingly challenging. In particular, conventional advertising techniques have become less effective especially in recent times. Consumers are now provided with substantially more entertainment options than just a few years ago, thereby reducing the number of consumers that are exposed to a given advertisement. Further, new technologies, such as portable music players, satellite radio, and digital video recorders ("DVRs"), have allowed the users to avoid or skip conventional advertisements entirely.

As advertisers try to find ways to reach more consumers, one advertising medium that has become more attractive are virtual worlds, like MMO computer applications. The number of participants in MMO computer applications has steadily increased in recent times, and this trend shows little, if any, signs of reversing. Further, MMO computer applications provide a single entertainment destination for many Internet users and gamers, thereby enabling advertisers to reach a larger number of consumers through a single advertising medium. As computer and Internet technologies continue to improve to provide more and better ways to include real-world advertisements within the virtual world, MMO computer applications will continue to grow as a significant advertising medium.

It is with respect to these considerations and others that the disclosure made herein is presented.

SUMMARY

Technologies are described herein for sharing advertising revenues with participants, such as participants of a virtual world. In particular, through the utilization of the technologies and concepts presented herein, advertisers can provide an incentive of compensation to encourage participants to utilize an advertiser-generated avatar to promote an advertisement and/or to interact with advertisements. In an example, compensation may include an alteration of an avatar associated with or controlled by a participant.

According to one aspect presented herein, a computer program provides an advertiser-generated avatar to a first participant. In particular, the advertiser-generated avatar may be a character or object associated with an advertisement. The first participant is initially associated with a current avatar. The computer program replaces the current avatar with the advertiser-generated avatar. In this way, the first participant is now associated with the advertiser-generated avatar instead of the current avatar. While the first participant is associated with the advertiser-generated avatar, the computer program monitors a level of interaction between the first participant and other participants. Further, the computer program determines an amount of compensation to provide the first participant based on the level of interaction between the first participant and the other participants. The compensation is then provided to the first participant.

It should be appreciated that although the features presented herein are described in the context of a MMO computer application, these features may be utilized with any type of virtual world or environment including, but not limited to, other types of games as well as online social communities. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
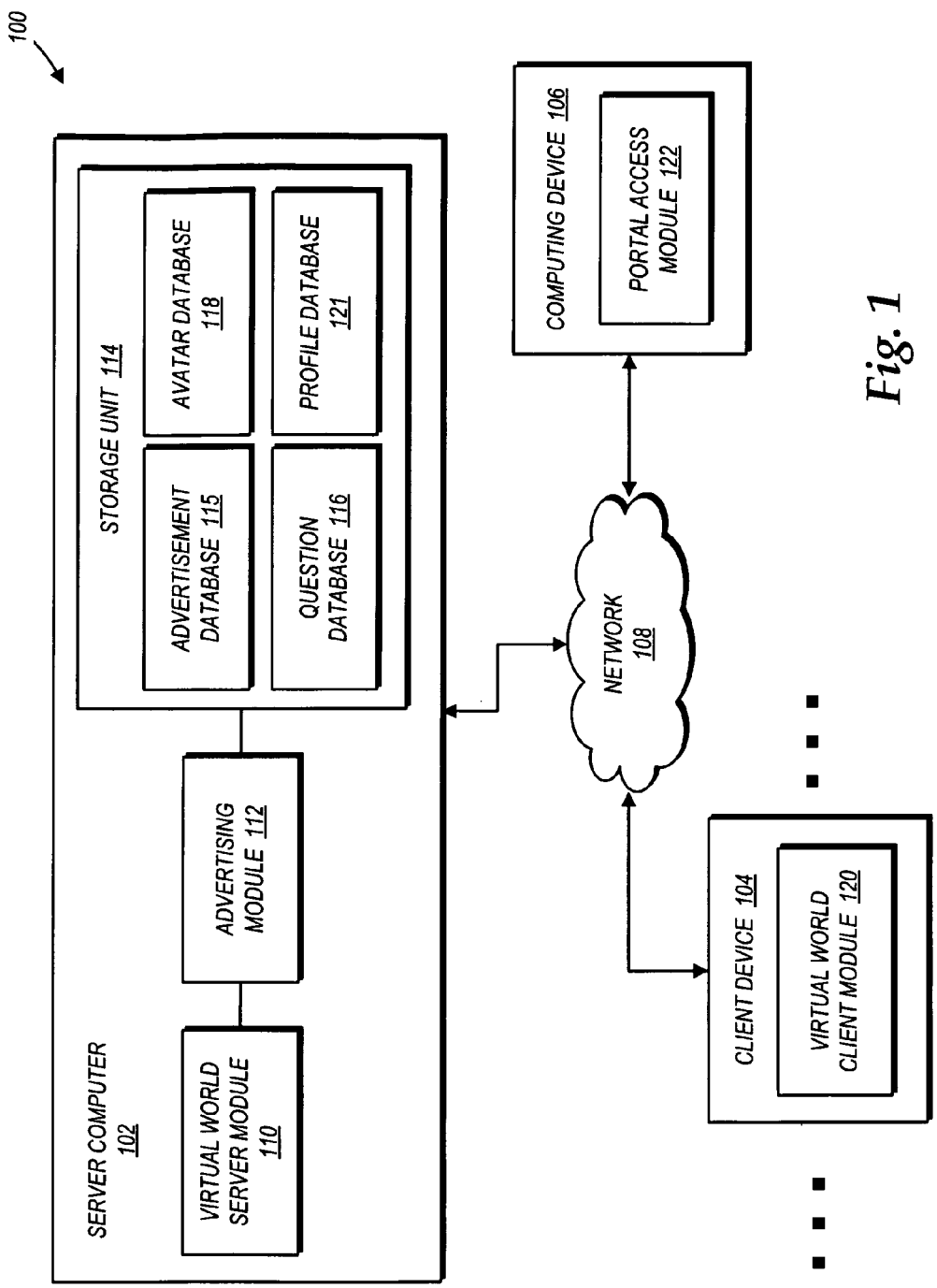
FIG. 1 is a network architecture diagram showing aspects of a network architecture capable of implementing a virtual world, such as a massively multiplayer online role-playing game.

The following detailed description is directed to technologies for sharing advertising revenue. Through the utilization of the technologies and concepts presented herein, advertising revenue may be shared with participants who promote an advertisement or interact with an advertisement. In one aspect, a participant is associated with an advertiser-generated avatar. The participant may traverse a virtual world with the advertiser-generated avatar and interact with other avatars via the advertiser-generated avatar. To encourage the participant to interact with other avatars, the participant may receive compensation as payment for interacting with other avatars. In another aspect, a participant receives compensation for interacting with an advertisement. For example, the advertisement may provide a number of questions. The amount of compensation may be based on the number of questions the participant correctly answers. Further, incorrect answers may also be awarded. In the case where the participant incorrectly answers a question, the participant may be provided with an advertisement showing a brand-accurate message. The compensation may include alterations of an avatar associated with and controlled by the participant.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

As used herein, the term virtual world refers to a computer-implemented environment, which may include simulated, lifelike environments as well as fanciful, non-existing environments. Exemplary virtual worlds may include any massively multiplayer online ("MMO") computer application including, but not limited to, massively multiplayer online role-playing games ("MMORPGs"), virtual social communities, and virtual reality computer applications. In one embodiment, the MMO computer application simulates a real world environment. For example, the virtual world may be defined by a number of rules, such as the presence of gravity or the lack thereof. In other embodiments, the MMO computer application includes a fanciful environment that does not simulate a real world environment.

The virtual world may be inhabited by avatars, which are virtual or symbolic representations of real world participants (hereinafter referred to as participants). As such, each avatar is typically associated with and controlled by a particular participant. Avatars may include two-dimensional and/or three-dimensional images. Through the virtual world, the avatars may interact with other avatars, as well as with virtual objects. Virtual objects may include virtual representations of real world objects, such as houses, cars, billboards, clothes, and soda cans, as well as fanciful creations, such as a teleportation machine or a flying car. According to exemplary embodiments, one or more virtual objects and one or more avatars in the virtual world are capable of providing an advertisement. The avatars and the virtual objects utilized in the virtual world may or may not be animated images.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing advertising in a virtual world will be described. In particular, FIG. 1 illustrates a simplified network architecture 100 for implementing a virtual world. The network architecture 100 shown in FIG. 1 includes a server computer 102, a client device 104, and a computing device 106, all of which are operatively coupled via a network 108. The network 108 may be any suitable network, such as a local area network ("LAN") or the Internet. Although only one client device 104 and one computing device 106 are illustrated in FIG. 1, the network architecture 100 may include multiple client devices and multiple computing devices in any suitable network configuration.

The client device 104 may be any suitable processor-based device, such as a computer or a gaming device. Exemplary gaming devices include the XBOX and the XBOX 360 from MICROSOFT CORPORATION, the WII from NINTENDO COMPANY, LIMITED, and the PLAYSTATION 3 and the PSP from SONY CORPORATION. Although not so illustrated in FIG. 1, the client device 104 may be coupled to any suitable peripheral devices to enable the participant to experience and interact with the virtual world. Exemplary peripheral devices may include an input device, such as a keyboard, a mouse, a microphone, and a game controller, and an output device, such as a display and speakers. Some peripheral devices may even provide both input and output functionality. For example, a game controller may provide vibration feedback.

As shown in FIG. 1, the client device 104 includes a virtual world client module 120, which interacts with the virtual world server module 110 executing on the server computer 102. In particular, the virtual world client module 120 may receive and process data from virtual world server module 110 and output the data to output devices coupled to the client device 104. Further, the virtual world client module 120 may receive data from input devices coupled to the client device 104 and transmit the data to the virtual world server module 110.

The virtual world client module 120 may include any suitable component for accessing the virtual world server module 110. In one example, the virtual world client module 120 may be a computer application configured to locally provide at least a portion of the virtual world for the client device 104. In this way, the amount of data retrieved from the server computer 102 by the client device 104 to generate the virtual world may be reduced. In another example, the virtual world client module 120 may be a web browser configured to retrieve the virtual world from the virtual world server module 110. Since many public computers, such as those found in Internet cafes, commonly have a web browser installed and prohibit the installation of new computer applications, providing participants a way to access the virtual world via the web browser may provide greater accessibility and convenience.

As shown in FIG. 1, the server computer 102 includes a virtual world server module 110, an advertising module 112, and a storage unit 114. The virtual world server module 110 generally administers the virtual world and serves as a conduit between multiple client devices, including the client device 104. The advertising module 112, operating in conjunction with the storage unit 114, generally enables an advertiser or other user to distribute advertising within the virtual world. The storage unit 114 may include an advertisement database 115, a question database 116, an avatar database 118, and a profile database 121, as illustrated in FIG. 1.

The advertisement database 115 may store advertisements. The advertisement may be in any multimedia format, such as text, audio, images, video, or combinations thereof. The question database 116 may store questions to be inserted into an advertisement. The avatar database 118 may store advertiser-created avatars. In one embodiment, an advertiser-created avatar is a promotional avatar that may be assigned to participants to promote an advertisement associated with the advertiser-created avatars. The profile database 121 may store advertising profiles for each participant. The profiles may include any suitable information regarding the participants that is relevant for advertisers. For example, the profiles may include demographic information, purchasing history, and purchasing preferences regarding the participants.

The advertising module 112, in conjunction with the storage unit 114, may provide the two aspects previously described. In the first aspect, a participant is associated with an advertiser-generated avatar. In one example, if the advertisement is for a movie (e.g., TRANSFORMERS) prominently featuring robots that transform into vehicles, the avatar may be one of the robots featured in the movie. In another example, if the advertisement is for cereal (e.g., TRIX) that is associated with a rabbit that enjoys eating the cereal, the avatar may be the rabbit. In yet another example, if the advertisement is for a digital media player (e.g., ZUNE from MICROSOFT CORPORATION, IPOD from APPLE, INCORPORATED), the avatar may be the digital media player. The participant may control the advertiser-generated avatar and interact with other avatars via the advertiser-generated avatar, thereby promoting the advertisement associated with the advertiser-generated avatar. To encourage the participant to interact with other avatars, the participant may receive compensation.

In the second aspect as described above, a participant receives compensation for interacting with an advertisement. For example, the advertisement may provide a number of questions. The questions may be created by advertisers to evaluate market attitudes and trends for particular brands, goods, services, and the like. The amount of compensation may be based on the number of questions the participant correctly answers. The amount of compensation may be based on the number of questions the participant correctly answers. Further, incorrect answers may also be awarded. In the case where the participant incorrectly answers a question, the participant may be provided with an advertisement showing a brand-accurate message. The compensation may include alterations of an avatar associated with and controlled by the participant. The operation of the advertising module 112 and the storage unit 114 is described in greater detail below with respect to FIG. 2-5.

When a participant desires to access the virtual world, the participant may initiate the virtual world client module 120 to establish a session with the virtual world server module 110 via the network 108. During the session, the virtual world server module 110 may transmit data (e.g., environment layouts, avatar movements of other participants) associated with the virtual world to the virtual world client module 120. Similarly, the virtual world client module 120 may transmit data from associated input devices to the virtual world server module 110. The virtual world client module 120 may further interact with the advertising module 112 to provide advertisements in the virtual world. Alternatively, the virtual world server module 110 may act as a conduit between the virtual world client module 120 and the advertising module 112 such that virtual world client module 120 and the advertising module 112 need not directly communicate.

Figure 2:
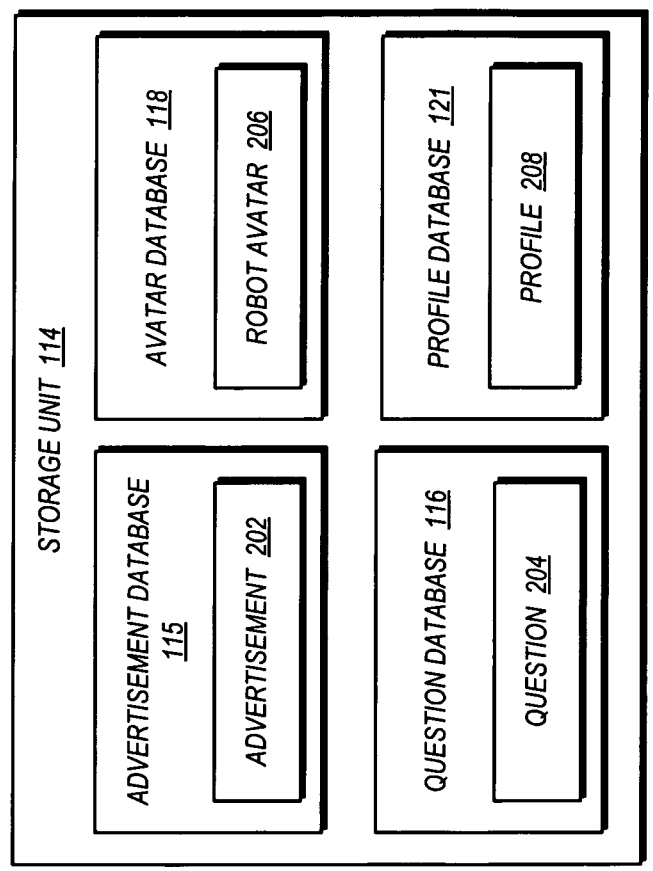
FIG. 2 is a computer architecture diagram showing aspects of a storage unit, in accordance with one embodiment.

Turning now to FIG. 2, a more detailed view of the storage unit 114 is shown, in accordance with one embodiment. As illustrated in FIG. 2, the advertisement database 115 includes an advertisement 202, and the question database includes a question 204. Further, the avatar database 118 includes a robot avatar 206, and the profile database 121 includes a profile 208. The profile 208 may include any suitable information regarding a second participant 312, as described below in FIG. 3. For example, the profile 208 may include demographic information (e.g., age, gender, technical skill, computer ownership, nationality, and income), purchasing history, and purchasing preferences regarding the second participant 312. In one embodiment, at least part of the information contained profile 208 is collected via a questionnaire provided when the second participant 312 initially joins the virtual world.

Figure 3A:
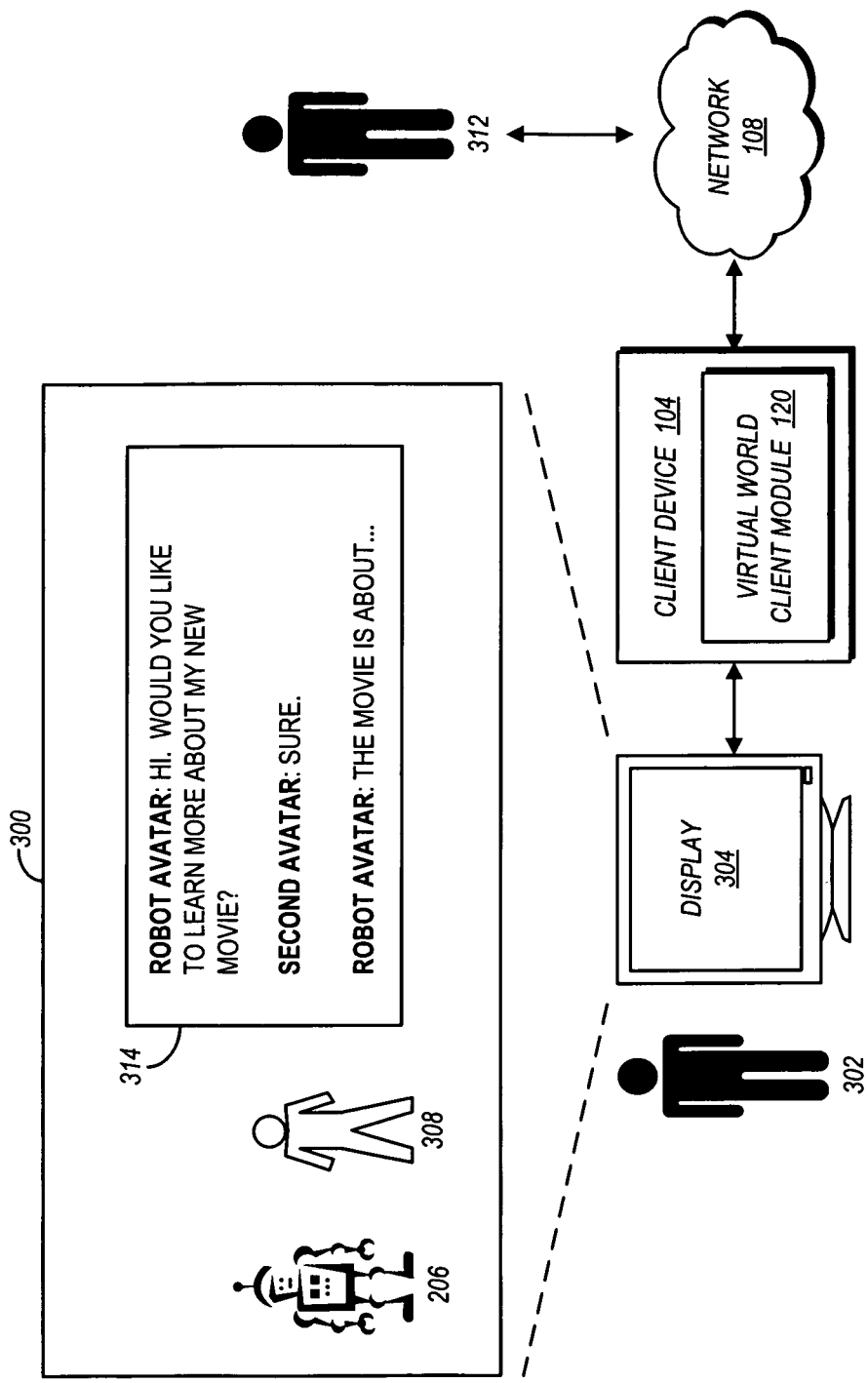
FIGS. 3A and 3B are screen display diagrams each showing an illustrative screenshot of a virtual world, in accordance with one embodiment.

Turning now to FIG. 3A, an illustrative screenshot 300 of a virtual world provided by the virtual world server module 110 and the virtual world client module 120 is shown, in accordance with one embodiment. A first participant 302 may view the screenshot 300 on a display 304 operatively coupled to the client device 104. As shown in FIG. 3A, the screenshot 300 illustrates the robot avatar 206 and a second avatar 308. The robot avatar 206 is associated with and controlled by the first participant 302 via the client device 104. In one embodiment, the first participant 302 controls the movement of the robot avatar 206 within the virtual world via an input device (not shown), such a keyboard, mouse, and game controller, operatively coupled to the client device 104. The second avatar 308 is a fictional character associated with a second participant 312 via a second device client device (not shown).

In an illustrative example, the robot avatar 206 is a recognizable robot featured in a successful motion picture. In this case, the advertiser may be a film studio promoting the movie. In order to promote the movie, the advertiser may generate avatars, such as the robot avatar 206, that participants can easily associate with the movie. Participants, such as the first participant 302, can give the advertiser permission to replace any avatars currently associated with the participant with the robot avatar 206 promoting the movie.

Continuing with the illustrative example, the first participant 302 has given permission to the advertiser to replace a current avatar with the robot avatar 206. As such, the first participant 302 now controls the robot avatar 206. The first participant 302 may be associated with the robot avatar 206 for any amount of time, such as for a fixed time or until a given condition is met. Since the robot avatar 206 is essentially a self-contained advertisement, the advertiser benefits when the robot avatar 206 traverses the virtual world and interacts with other avatars, such as the second avatar 308.

To encourage the first participant 302 to traverse the virtual world and interact with other avatars, the advertiser may provide compensation. The amount of compensation may be based on any suitable criteria. In one example, the compensation may be based on the number of avatars with whom the robot avatar 206 interacts. In another example, the compensation may be based on the amount of time the robot avatar 206 spends interacting with other avatars. Other criteria may include the popularity or influence of the other avatars, the quality of the interaction with the other avatars, and the effectiveness of the interaction with other avatars.

As illustrated in FIG. 3A, the robot avatar 206 has approached the second avatar 308. Upon initiating an interaction with the second avatar 308, the robot avatar 206 displays a chat window 314, in which the robot avatar 206 and the second avatar 308 can converse. To encourage the robot avatar 206 to traverse other areas of the virtual world and to interact with more avatars, the first participant 302 may receive compensation. The compensation may be in any form, such as real world currency, virtual world currency, real world objects, virtual world objects, and points.

Figure 3B:
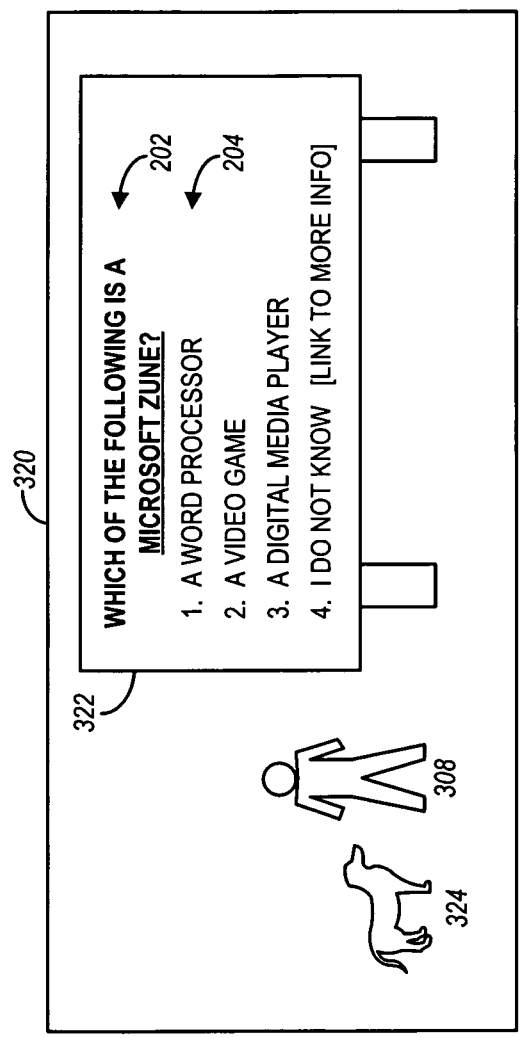

Turning now to FIG. 3B, another illustrative screenshot 320 of the virtual world is provided by the virtual world server module 110 and the virtual world client module 120 is shown, in accordance with one embodiment. As illustrated in FIG. 3B, the second avatar 308 has approached a billboard 322 containing the advertisement 202 and the question 204. The question 204 is a question about the ZUNE digital media player from MICROSOFT CORPORATION. When the second avatar 308 correctly answers the question 204, the second avatar 308 may be provided with compensation as well as additional questions. The compensation may be in any form, such as real world currency, virtual world currency, real world objects, virtual world objects, and points. For example example, the compensation may include virtual food to keep a virtual pet, such as a virtual dog 324, alive and functioning. In another embodiment, the compensation may also include attributes that alter the second avatar 308. For example, the attributes may alter the second avatar 308 by providing special abilities or a unique indicator (e.g., a glow around the second avatar 308).

In one embodiment, the question 204 provided to the second avatar 308 is selected from the question database 116 based on the profile 208. For example, the second avatar 308 may be provided with questions regarding products, such as the ZUNE digital media player, that the second participant 312 is likely to purchase based on her purchase history. In another embodiment, the questions provided to the second avatar 308 are randomly selected. The questions provided may be used for a variety of purposes, such as testing the brand name associations (i.e., whether the second participant 312 is aware of the ZUNE digital media player) or to evaluate potential target markets.

The questions may also be used to effectively push an advertisement to the second participant 312. For example, by exposing the second participant 312 to an interactive and rewarding advertisement like the one shown in the screenshot 320, the advertiser is able to promote the ZUNE digital media player to the second participant 312 for a longer period of time and with greater attention. With non-interactive advertisements, such as conventional billboards, the second participant 312 may simply ignore the advertisements. It should be appreciated that answering one question correctly or incorrectly may lead to additional questions and additional compensation for the second participant 312. The additional questions may or may not be associated with the question 204.

Although not so limited, the chat window 314 and the billboard 322 illustrated in FIGS. 3A and 3B, respectively, are primarily text based. It should be appreciated that the questions provided by the question database 116 may include questions in any multimedia format, such as text, audio, pictures, video, and combinations thereof. The advertisement 202 in which the question 204 is provided may also include richer content. Similarly, the chat window 314 may include other multimedia content to promote the advertisement associated with the robot avatar 206.

Figure 4:
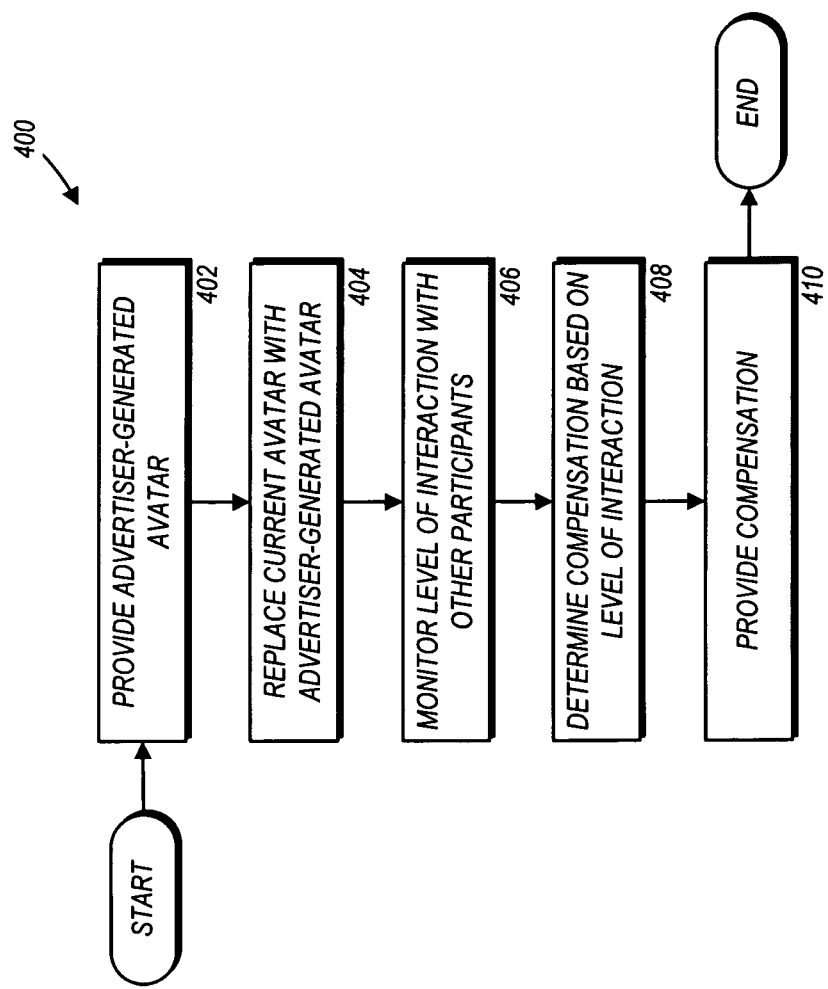
FIG. 4 is a flow diagram showing aspects of an illustrative process for providing advertising through an avatar, in accordance with one embodiment.

Referring now to FIG. 4, additional details will be provided regarding the embodiments presented herein for providing advertising in a virtual world. In particular, FIG. 4 is a flow diagram illustrating aspects of one method provided herein for sharing advertising revenue. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 4, a routine 400 begins at operation 402, where the advertising module 112 provides an advertiser-generated avatar to a participant. For example, the advertising module 112 may provide the robot avatar 206 to the first participant 302. In one embodiment, the advertiser-generated avatar is stored in the avatar database 118. The advertiser-generated avatar may be any suitable character or object associated with an advertisement. In particular, the advertiser-generated avatar may be a widely and easily recognizable character or object.

In one example, to advertise the movie TRANSFORMERS, an advertiser may provide the robot BUMBLEBEE, which is a popular character in the movie, as the advertiser-generated avatar. The BUMBLEBEE avatar may include functionality to "transform" between the robot and the CHEVROLET CAMARO depicted in the movie. In another example, to advertise the cereal TRIX, an advertiser may provide the TRIX RABBIT as the advertiser-generated avatar. The TRIX RABBIT avatar may include functionality to say the popular catchphrase "SILLY RABBIT, TRIX ARE FOR KIDS." In yet another example, to advertiser the ZUNE digital media player from MICROSOFT CORPORATION, an advertiser may provide an image of the ZUNE digital media player as the advertiser-generated avatar. The ZUNE digital media player avatar may include functionality to change colors, change models, and play various digital media. After the advertising module 112 provides the advertiser-generated avatar to the participant, the routine 400 proceeds to operation 404.

At operation 404, the advertising module 112 replaces a current avatar associated with or controlled by the participant with the advertiser-generated avatar. In this way, instead of controlling the current avatar, the participant at least temporarily controls the advertiser-generated avatar. In one embodiment the participant gives permission to advertisers to replace the current avatar with the advertiser-generated avatar. After the advertising module 112 replaces the current avatar with the advertiser-generated avatar, the routine 400 proceeds to operation 406.

At operation 406, the advertising module 112 monitors the level of interaction between the advertiser-generated avatar and other avatars. For example, the advertising module 112 may monitor the level of interaction between the robot avatar 206 and the second avatar 308. The way the level of interaction is determined may be specified by the advertiser and may include any suitable characteristics related to the interaction between the participants. In one example, the level of interaction is determined based on the amount of time the advertiser-generated avatar interacts with other avatars. In another example, the level of interaction is determined based on the number of avatars with whom the advertiser-generated avatar interacts. In yet another example, the level of interaction is determined based on the quality or effectiveness of the interaction between the advertiser-generated avatar and other avatars.

The quality or effectiveness of the interaction may be determined based on any suitable factors including, but not limited to, the popularity of the participants controlling the other avatars, the amount of time spent between the avatars discussing the advertiser-generated avatar or the advertisement associated with the advertiser-generated avatar, and the amount of purchases that are made in response to interacting with the advertiser-generated avatar. After the advertising module 112 monitors the level of interaction between the advertiser-generated avatar and the other avatars, the routine 400 proceeds to operation 408.

At operation 408, the advertising module 112 determines an amount of compensation based on the level of interaction. The advertising module 112 may also determine the type of compensation based on the level of interaction. To encourage the participant to replace its current avatar with the advertiser-generated avatar and also to encourage the participant to interact with other avatars as the advertiser-generated avatar, the advertiser may provide compensation to the participant. The compensation may include, but is not limited to, real world objects, virtual world objects, real world currency, virtual world currency, points, and attributes. After the advertising module 112 determines the amount of compensation, the routine 400 proceeds to operation 410.

At operation 410, the advertising module 112 provides the compensation to the participant. After a given period of time, a given condition is fulfilled, or a request from the participant, the advertising module 112 may replace the advertiser-generated avatar with the current avatar such that the participant is again associated with or controls the current avatar.

Figure 5:
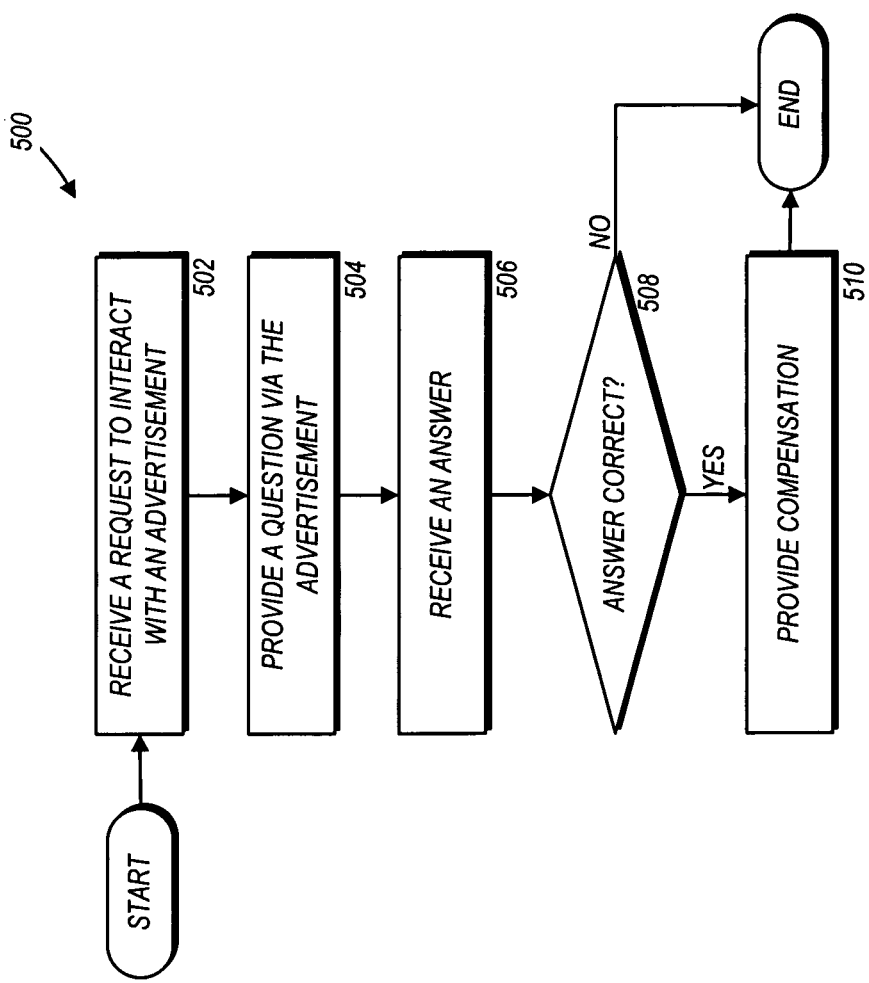
FIG. 5 is a flow diagram showing aspects of an illustrative process for providing an interactive advertisement, in accordance with one embodiment.

Referring now to FIG. 5, a routine 500 begins at operation 502, where the advertising module 112 receives a request from an avatar to interact with an advertisement. For example, the advertising module 112 may receive a request from the second avatar 308 to interact with the billboard 322. The advertisement may in any suitable form, such as text, images, audio, video, or combinations thereof. The advertisement may be part of a virtual object, such as the billboard 322, or part of an avatar, such as the robot avatar 306. In an example of the latter, the second avatar 308 may initiate an interaction with the robot avatar 306, or vice versa. After the advertising module 112 receives the request, the routine 500 proceeds to operation 504.

At operation 504, the advertising module 112 provides a question via the advertisement. In one embodiment, the question, such as the question 204, is selected from a plurality of questions stored in the question database 116. The question may be selected randomly or based on a participant profile, such as the profile 208. As previously mentioned, the profile 208 may contain demographic information, purchase preferences, a purchase history, or other suitable information related to the second participant 312. After the advertising module 112 provides the question, the routine 500 proceeds to operation 506.

At operation 506, the advertising module 112 receives an answer to the question from the second avatar 308. The routine 500 continues to operation 508, where the advertising module 112 determines whether the answer is correct. If the answer is correct, the routine 500 continues to operation 510, where the advertising module 112 provides compensation to the second avatar 308. After the advertising module 112 provides compensation, the routine 500 ends. If the answer is incorrect, the routine 500 ends. In another embodiment, the routine 500, instead of ending, returns to operation 504, where the advertising module 112 provides another question via the advertisement.

To encourage the participant, by way of her avatar, to interact with an advertisement, the advertiser may provide compensation to the participant. The compensation may include, but is not limited to, real world objects, virtual world objects, real world currency, virtual world currency, points, and attributes. By providing an interactive advertisement in which the participants are rewarded for interacting with the advertisement, the participants are more inclined to view the advertisement and also more focused when viewing the advertisement. In particular, the interactive advertisement requires activity from the participant. This significant differs from conventional, passive advertisements in which a viewer can easily lose interest. Further, the answers obtained in response to the questions not only provide interaction for the participants, but also provide relevant information regarding the participants that advertisers may be utilized for a variety of purposes. For example, the answers may be utilized to evaluate market attitudes and trends.

Figure 6:
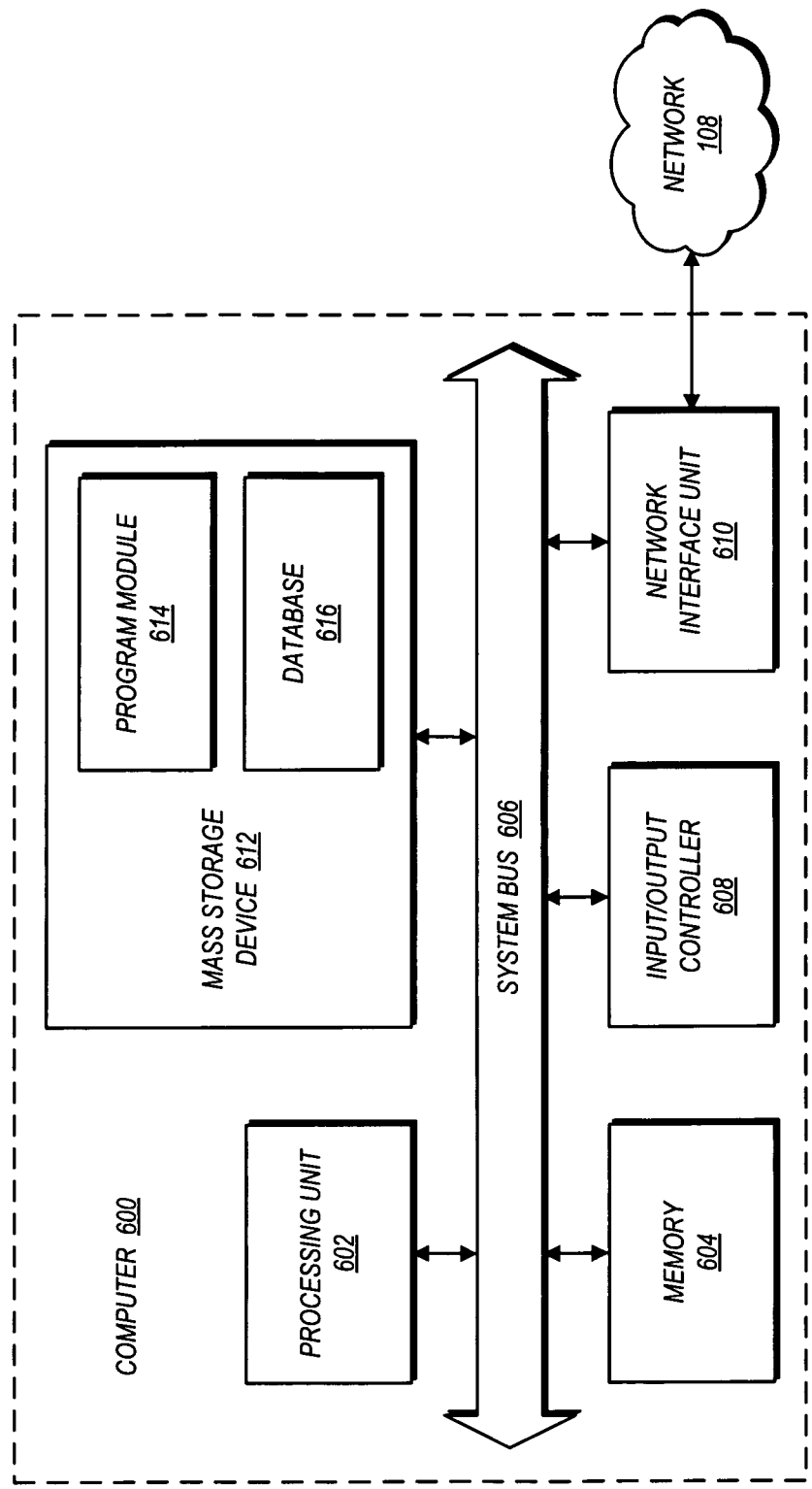
FIG. 6 is a computer architecture diagram showing aspects of an illustrative computer hardware architecture for a computing system capable of implementing aspects of the embodiments presented herein.

Referring now to FIG. 6, an exemplary computer architecture diagram showing aspects of a computer 600 is illustrated. Examples of the computer 600 may include the server computer 102, the client device 104, and the computing device 106. The computer 600 includes a processing unit 602 ("CPU"), a system memory 604, and a system bus 606 that couples the memory 604 to the CPU 602. The computer 600 further includes a mass storage device 612 for storing one or more program modules 614 and one or more databases 616. Examples of the program modules 614 may include the advertising module 112, the virtual world client module 120, and the virtual world server module 110. Examples of the databases 616 may include the advertisement database 115, the question database 116, the avatar database 118, and the profile database 121. The mass storage device 612 is connected to the CPU 602 through a mass storage controller (not shown) connected to the bus 606. The mass storage device 612 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 108. The computer 600 may connect to the network 108 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

Based on the foregoing, it should be appreciated that technologies for sharing advertising revenues with virtual world participants are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing advertising through an avatar, the computer-implemented method comprising computer-implemented operations for:
    providing, by a computer having a processor and a memory, an advertiser-generated avatar to a first participant, the advertiser-generated avatar associated with an advertisement, the first participant having control of a current avatar, the current avatar comprising a first animated character representation associated the first participant, the advertiser-generated avatar comprising a second animated character representation associated with the advertisement, the current avatar and the advertiser-generated avatar are adapted to traverse a virtual world and interact with other avatars controlled by other participants;
    replacing, by the computer, the current avatar with the advertiser-generated avatar such that the first participant gains control of the advertiser-generated avatar and loses control of the current avatar, the advertiser-generated avatar traverses the virtual world as controlled by the first participant;
    while the first participant has control of the advertiser-generated avatar, monitoring, by the computer, a level of interaction between the first participant and other participants via the advertiser-generated avatar controlled by the first participant and the other avatars controlled by the other participants by monitoring an effectiveness of the interaction between the first participant and the other participants, the effectiveness based on an amount of times spent by the other participants discussing the advertiser-generated avatar and the advertisement associated with the advertiser-generated avatar, and an amount of purchases that are made by the other participants as a result of interacting with the advertiser-generated avatar;
    determining, by the computer, an amount of compensation to provide the first participant based on the level of interaction between the first participant and the other participants; and
    providing, by the computer, the compensation to the first participant relative to the determined level of interaction.

2. The computer-implemented method of claim 1, further comprising upon providing the compensation to the first participant, replacing, by the computer, the advertiser-generated avatar with the current avatar such that the first participant gains control of the current avatar and loses control of the advertiser-generated avatar.

3. The computer-implemented method of claim 1, wherein the advertiser-generated avatar comprises an image of a character associated with the advertisement.

4. The computer-implemented method of claim 1, wherein monitoring a level of interaction between the first participant and other participants further comprises monitoring a number of participants with whom the first participant interacts.

5. The computer-implemented method of claim 1, wherein monitoring a level of interaction between the first participant and other participants further comprises monitoring an amount of time in which the first participant interacts with the other participants.

6. The computer-implemented method of claim 1, wherein the compensation comprises one of real world currency, virtual world currency, real world objects, virtual world objects, or points.

7. The computer-implemented method of claim 1, wherein the compensation comprises virtual pet food for a virtual pet associated with the first participant.

8. A computer-readable medium having computer-executable instructions stored thereon which, when executed by a computer, cause the computer to:
    provide an advertiser-generated avatar to a first participant of a virtual world, the advertiser-generated avatar associated with an advertisement, the first participant controlling a current avatar, the current avatar comprising a first animated character representation associated the first participant, the advertiser-generated avatar comprising a second animated character representation associated with the advertisement, the current avatar and the advertiser-generated avatar are adapted to traverse a virtual world and interact with other avatars controlled by other participants;
    replace the current avatar with the advertiser-generated avatar such that the first participant gains control of the advertiser-generated avatar and loses control of the current avatar, the advertiser-generated avatar traverses the virtual world as controlled by the first participant;
    receive a request from a second avatar controlled by a second participant of the virtual world to interact with the advertiser-generated avatar while the first participant has control of the advertiser-generated avatar;
    monitor an effectiveness of the interaction between the advertiser-generated avatar and the second avatar controlled by the second participant, the effectiveness based on an amount of time spent discussing the advertiser-generated avatar and the advertisement associated with the advertiser-generated avatar, and an amount of purchases that are made by the second participant as a result of the interacting with the advertiser-generated avatar;
    upon receiving the request from the second avatar to interact with the advertiser-generated avatar while the first participant has control of the advertiser-generated avatar, provide a question regarding a product or service brand associated with the advertisement from the advertiser-generated avatar to the second avatar, and provide a first compensation to the first participant in response to the request;
    receive from the second avatar an answer to the provided question;
    determine whether the answer is correct;
    upon determining that the answer is correct, provide a second compensation to the second participant in response to the answer being correct; and
    upon determining that the answer is incorrect, providing a brand-accurate message regarding the product or service brand to second participant.

* * * * *